United States Patent [19]

Giddings

[11] 4,445,144
[45] Apr. 24, 1984

[54] METHOD FOR DETECTING ECCENTRICITY IN A VIDEO DISC AND IN A VIDEO DISC PLAYER

[75] Inventor: Gary M. Giddings, Laguna Hills, Calif.

[73] Assignee: Discovision Associates, Costa Mesa, Calif.

[21] Appl. No.: 333,237

[22] Filed: Dec. 21, 1981

[51] Int. Cl.³ .................... A04N 5/85; G11B 21/10
[52] U.S. Cl. .................... 358/342; 360/33.1; 360/77; 369/44; 369/111; 369/56
[58] Field of Search ............ 358/335, 342, 139, 106, 358/107; 360/31, 33.1, 77; 369/53–58, 50, 44, 111

[56] References Cited

U.S. PATENT DOCUMENTS

| | | | |
|---|---|---|---|
| 3,711,640 | 1/1973 | Takano | 360/31 |
| 3,917,902 | 11/1975 | Olson | 358/139 |
| 4,067,044 | 1/1978 | Maeda | 369/32 |
| 4,158,857 | 6/1979 | Hiraguri | 358/139 |

Primary Examiner—Alan Faber
Attorney, Agent, or Firm—Ronald J. Clark

[57] ABSTRACT

A method for detecting and measuring eccentricity in a video disc and a video disc player, in which a video signal representing a special eccentricity test pattern is recorded on a prescribed set of adjacent recording tracks on the disc. Each frame of the video signal is recorded on a separate track, and the successive frames exhibit a prescribed movement. During an eccentricity test, the player scans the disc at a fixed radius, so that eccentricity in either the disc or the player causes it to scan cyclically across a plurality of tracks during each disc revolution. The playback signal therefore includes segments of the signal recorded on each of the scanned tracks, the shape of the displayed test pattern indicates the magnitude of combined eccentricity of the disc and player.

11 Claims, 4 Drawing Figures

TRACKING SERVO CLOSED

TRACKING SERVO OPEN

METHOD FOR DETECTING ECCENTRICITY IN A VIDEO DISC AND IN A VIDEO DISC PLAYER

BACKGROUND OF THE INVENTION

This invention relates generally to video discs and video disc players, and, more particularly, to techniques for detecting and measuring eccentricity in such discs and players.

Video discs typically record video information signals in a sequence of substantially circular and concentric recording tracks surrounding a center hole. The recorded signal is normally recovered by a player apparatus having a spindle for engaging the center hole and rotating the disc in a prescribed fashion, and an information recovery device for scanning the rotating disc while moving radially from track to track. The information recovery device typically includes means for directing a reading beam of light at the rotating disc, which reflects the beam in accordance with the recorded information, and a photodetector for detecting the modulated intensity of the reflected beam.

Problems in recovering the recorded signal can sometimes arise if the center hole in the disc is not precisely centered (i.e., is eccentric) with respect to the concentric recording tracks. When this occurs, the radius of each recording track changes cyclically as the disc rotates. A similar effect arises if the spindle itself is eccentric with respect to its axis of rotation. To overcome these eccentricity problems, the player normally includes a tracking servo for controllably moving the point of impingement of the reading beam on the disc to follow a selected track. This technique is ordinarily effective, however, only if the radial excursion of the track is less than a prescribed amount, e.g., 100 track spacings.

During the manufacture of video discs, it is desirable to measure the degree of eccentricity of each disc. One prior technique has been to rotate the disc on a player apparatus while disabling the tracking servo such that the reading beam scans the disc at a fixed radius. Counting the number of tracks that cross beneath the beam during each revolution then provides a measure of eccentricity. An alternate technique is to monitor the relative timing of a periodic signal included in the playback signal, as is done for example in a conventional time base error correction system, and to measure the magnitude of any deviation of that periodic signal relative to a fixed local reference signal.

The two techniques described above have proven generally effective in providing accurate measurements of video disc eccentricity. However, there is a need for an even simpler technique, which does not require the inclusion of special circuitry in the player apparatus. The present invention fulfills this need.

SUMMARY OF THE INVENTION

The present invention resides in a technique for detecting eccentricity in video discs and video disc players. During formation of the video discs, a video signal representing a special eccentricity test pattern is recorded on a prescribed set of adjacent recording tracks, with each successive video frame being recorded on a separate track. During playback of the disc on a video disc player apparatus, information recovery means including, for example, a reading beam, scans the set of adjacent tracks without attempting to follow any one particular track. Eccentricity in either the disc or the player apparatus causes the information recovery means to recover, sequentially, segments of the video signal recorded on a plurality of tracks during each disc revolution. The recovered signal is displayed on a video monitor. In accordance with the invention, the test pattern represented by the recorded video signal exhibits prescribed movement on successive video frames, and the shape of the displayed video playback signal indicates the presence of eccentricity in the video disc or in the player apparatus.

More particularly, the recorded test pattern includes a straight reference line or bar superimposed on a fixed grid pattern. The bar is preferably vertically oriented, and located on the left side of the video frame for the signal recorded on the track at one edge of the set of tracks and on the right side of the video frame for the signal recorded on the track at the other edge of the set of tracks. The bar moves horizontally by a constant amount on each of the successive intermediate tracks.

Thus, if the recorded signal is played back by scanning each of the tracks in succession, the vertical bar appears to wipe across the video screen at a constant rate. When the tracking servo is opened, however, such that the reading beam is not made to follow any one particular track, the beam traverses cyclically across a plurality of tracks due to eccentricity-induced changes in track radius. This causes the vertical bar displayed on the screen to be bowed, with the amplitude of the bar's horizontal deviation indicating the magnitude of the eccentricity. Eccentricity in both the disc and the spindle of the player apparatus can be measured in this fashion.

Other aspects and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENT

Figure 1:
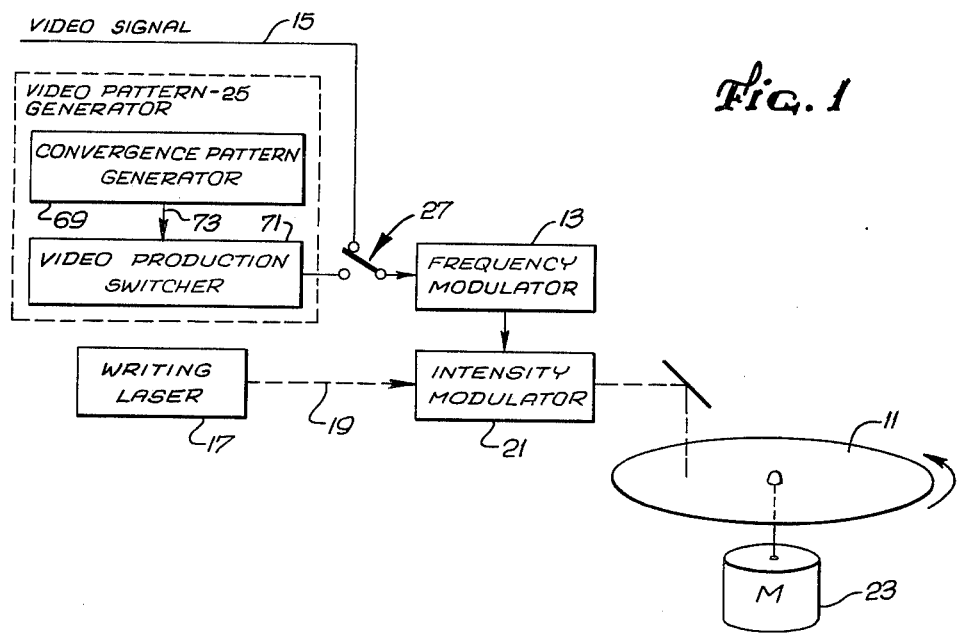
FIG. 1 is a simplified block diagram of apparatus for recording a video signal including a prescribed eccentricity test pattern signal on a video disc recording master.

Referring now to the drawings for purposes of illustration, and particularly to FIG. 1, there is shown an apparatus for recording a video signal on a video disc recording master 11. The recording apparatus includes a frequency modulator 13 for modulating a carrier signal with a video signal supplied on line 15, a writing laser 17 for generating a writing beam of light 19 having a substantially constant intensity, and an intensity modulator 21 for modulating the intensity of the writing beam in accordance with the frequency-modulated signal output by the frequency modulator. Optical means (not shown) images the intensity-modulated beam onto the video disc master, as it is rotated by a spindle motor 23 in a prescribed fashion. This records the video signal on the master, in a sequence of substantially circular and concentric recording tracks.

On a prescribed set of adjacent tracks on the master 11, a video signal representing a prescribed eccentricity test pattern is recorded in place of the video signal supplied on line 15. This set of tracks preferably includes about 100 tracks located near the inner periphery of the master. Each track records a separate one of the successive frames in the signal. The video signal representing the test pattern is produced by a test pattern generator 25, and a switch 27 selectively couples this signal to the frequency modulator 13 in place of the video signal supplied on line 15. As will be described below, this special test pattern can be used to detect and measure eccentricity in both video disc replicas of the master and player apparatus for playing back the replicas.

Video disc replicas are manufactured from the recorded video disc master 11 using conventional techniques. This manufacturing process typically includes a step of punching or molding a circular hole in the center of the disc for engagement by the spindle of a player apparatus in rotating the disc in a prescribed fashion. Ideally, the hole is precisely centered in the disc with respect to the concentric recording tracks. Limitations in the manufacturing process, however, normally cause the hole to be eccentric to at least a limited extent. Acceptable disc replicas typically have eccentricities of up to about 50 to 100 track spacings.

Figure 2:
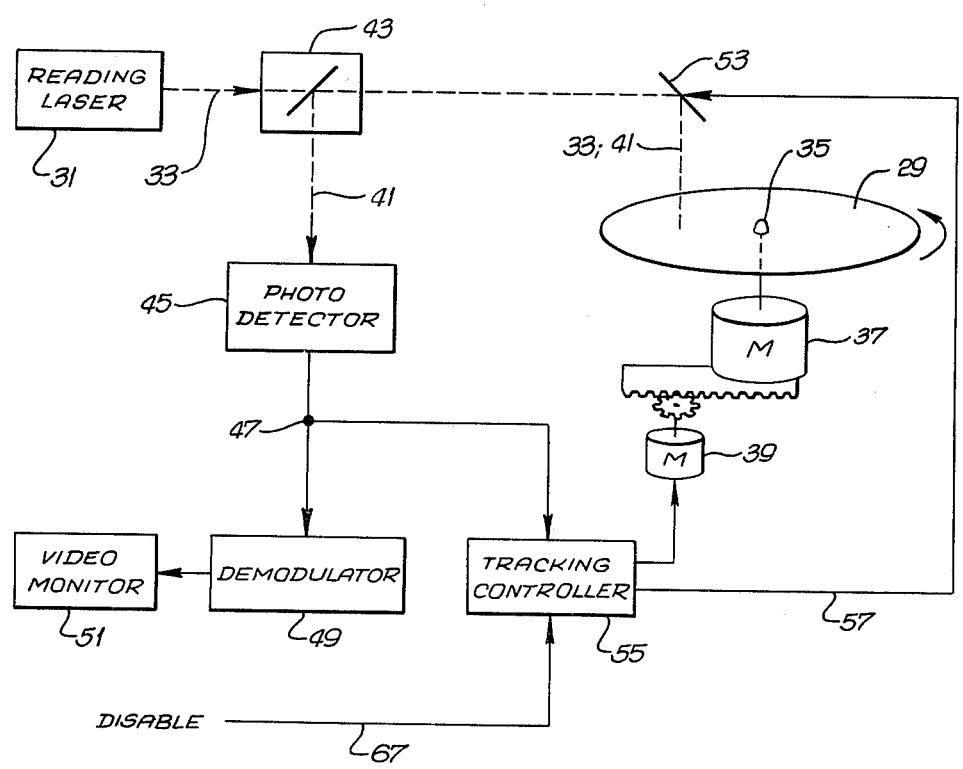
FIG. 2 is a simplified block diagram of player apparatus for recovering the video signal recorded on a video disc replica of the recording master of FIG. 1.

A player apparatus for playing back a replica disc 29 of the video disc master 11 is depicted in FIG. 2. The apparatus includes a reading laser 31 for generating a reading beam of light 33 having a substantially constant intensity, and optical means (not shown) for imaging the reading beam onto the disc. A center hole in the disc is engaged by a spindle 35, which is rotated by a spindle motor 37, and the disc, spindle and spindle motor, together, are translated laterally relative to the reading beam by a carriage motor 39, in a conventional fashion. The rotating disc reflects the incident reading beam is in accordance with the recorded information, to produce a modulated beam 41 that is directed along substantially the same path as the incident beam back to a beam splitter 43, which separates it from the incident beam and directs it to a photodetector 45 for detection. The photodetector outputs a corresponding playback signal for coupling over line 47 to a demodulator 49, which demodulates the signal to a baseband video format for display on a video monitor 51.

Eccentricity in either the disc 29 or the spindle 35 can cause the radius of the particular track being scanned by the reading beam 33 to change cyclically with each disc revolution. To compensate for these changes, the player apparatus includes a conventional tracking servo for controllably directing the beam to impinge continuously on a selected track. The servo includes a movable mirror 53 disposed in the path of the reading beam and a tracking controller 55 for monitoring the playback signal output by the photodetector 45 and producing a tracking error signal for coupling over line 57 to the movable mirror. This controllably aligns the reading beam with the centerline of the selected track.

Figure 3:
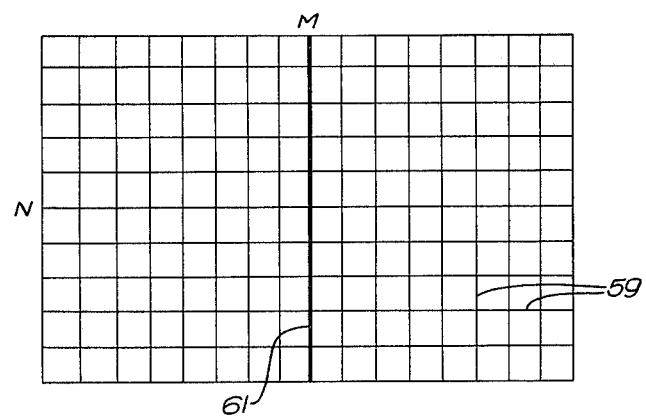
FIG. 3 is a diagram of the video picture that results when the player apparatus of FIG. 2 scans the replica disc with its tracking servo closed such that it scans a single track recording the special eccentricity test pattern signal.
Figure 4:
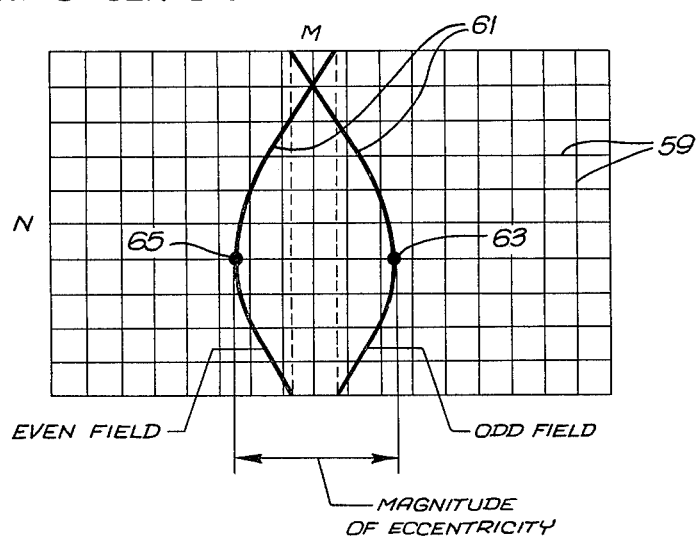
FIG. 4 is a diagram of the video picture that results when the player apparatus of FIG. 2 scans the replica disc with its tracking servo opened, such that it cyclically traverses a number of tracks because of eccentricity in either the disc or the player apparatus itself.

In accordance with the invention, the special eccentricity test pattern signal recorded on the prescribed set of tracks includes a fixed grid background pattern 59 with a vertical bar 61 that moves at a substantially constant rate across the screen as the signal progresses from the frame recorded on the first track of the set to the frame recorded on the last track in the set. FIG. 3 depicts one frame of the test pattern, with the vertical bar located about halfway between its initial location on the left side of the frame and its final location on the right side of the frame. If the tracking servo is opened, however, such that the reading beam 33 impinges on the rotating disc 29 at a substantially constant radius, eccentricity in either the disc or the player spindle 35 causes the beam to move cyclically across a plurality of different tracks in the set. The vertical bar displayed by the video monitor 51 is therefore curved in a prescribed fashion, as shown in FIG. 4. The magnitude of the bar's horizontal deviation is proportional to the magnitude of eccentricity.

The reason for the curvature of the displayed reference bar 61 when the tracking servo is opened will now be explained with reference to FIG. 4. At the time the player apparatus begins recovering and displaying the start of a video frame, the reading beam 33 impinges on a particular initial track on the disc 29. At this particular circumferential location on the disc, the beam is, in this example, traversing radially outwardly with respect to the initial track. Actually, of course, the tracks are moving radially inwardly with respect to the radially-fixed beam. Since the larger-radius tracks record video signals in which the reference bar 61 is located further to the right, the displayed reference bar deviates to the right as the horizontal scan lines progress downwardly on the displayed frame.

Eventually, the reading beam 33 reaches the outermost track it will scan, and the displayed reference bar 61 is located at its furthest point to the right of the picture, as indicated by the reference numeral 63. Thereafter, the beam begins traversing radially inwardly with respect to the recorded tracks such that the displayed reference bar appears to deviate to the left. This leftward movement continues as the displayed picture progresses from the odd field to the even field. When the beam reaches the innermost track it will scan, the displayed reference bar is located at its furthest point to the left of the picture, as indicated by the reference numeral 65. The beam thereafter again traverses radially outwardly with respect to the recorded tracks and returns to the initial track at the end of the frame.

It should be appreciated that the magnitude of the horizontal deviation of the displayed reference bar 61 indicates the number of tracks the reading beam 33 traverses during each revolution of the disc. This is, of course, a measure of the combined eccentricity of the disc 29 and the player spindle 35.

The test pattern generator 25 (FIG. 1) includes a conventional convergence pattern generator 69 and a conventional video production switcher 71. The generator 69 produces a video signal representing the fixed grid pattern 59 for coupling line 73 to the switcher, which superimposes the movable vertical bar 61 on it. The switcher is appropriately connected to wipe horizontally from a first picture to a second picture, with a thin border between the pictures and with the two pictures both corresponding to the fixed grid pattern. A precisely timed ramp signal controls the horizontal wipe.

In the preferred embodiment, the eccentricity test pattern signal includes about 100 video frames and is recorded on a corresponding number of tracks. The vertical bar 61 moves from the leftmost edge of the frame to the rightmost edge by about one percent on each successive frame. When measuring eccentricity during playback, the reading beam 33 is moved to a radial location nominally corresponding to the midpoint of the set of 100 tracks and the tracking servo is opened by means of a digital disable signal supplied on line 67 (FIG. 1). Both the carriage motor 39 and the movable mirror 53 therefore remain stationary and the reading beam remains fixed at this radius.

In an alternative mode of operation, the carriage motor 39 continues to operate during the eccentricity test, but in a slow forward or slow reverse mode. The reading beam 33 therefore moves radially outwardly or inwardly at a prescribed, relatively low rate. In that case, the displayed reference bar 61 depicted in FIG. 4 would move to either the right or left at a corresponding rate. The shape of the displayed reference bar, however, would remain unchanged.

It should be appreciated that the technique of the present invention can be used to minimize the combined eccentricity of the replica disc 29 and player spindle 35 by orienting their respective eccentricities at about 180 degrees with respect to each other. This can be achieved using an iterative process in which the disc is clamped to the spindle at a number of different circumferential locations until the eccentricity indicated by the displayed test pattern is minimized.

Although the eccentricity test pattern signal is recorded on the disc 29 with each video frame on a separate track, it should be apparent that this is not a requirement for the video signal recorded on the remainder of the disc. The remaining tracks on the disc can, for example, record the signal in a more uniform recording density, with the number of video frames recorded on each track proportional to the track's radius.

It should be appreciated from the foregoing description that the present invention provides an improved technique for detecting, measuring, and minimizing eccentricity in a video disc and video disc player. A special test pattern is recorded on a prescribed set of adjacent tracks on the disc and the player scans these tracks without attempting to follow any one track in particular. A display of the detected video signal indicates the magnitude of the eccentricity.

Although the invention has been described in detail with reference to the presently preferred embodiment, it should be understood by those of ordinary skill in the art that various modifications can be made without departing from the spirit and scope of the invention. Accordingly, the invention should not be limited except as by the appended claims.

I claim:

1. A method for detecting eccentricity in a video disc and in a player apparatus for playing the video disc, the player apparatus including means for rotating the disc at a prescribed constant rate, information recovery means for scanning the rotating disc with a radiant energy beam to recover a video signal recorded on it, and a tracking servo for controllably directing the beam to impinge continuously on a selected recording track on the disc, the tracking servo being operable in conventional closed loop and open loop conditions, the method comprising steps of:

recording a prescribed video signal on a set of adjacent recording tracks on the video disc, each video frame of the signal being recorded on a separate one of the successive tracks, the video signal representing a test pattern giving the effect of a prescribed movement of at least a part of the test pattern on successive frames;

scanning the set of adjacent recording tracks using the information recovery means while operating the tracking servo in the open loop condition, any eccentricity in the video disc or in the player apparatus causing the information recovery means to scan cyclically across a plurality of tracks and successively recover segments of the video signal recorded on each track; and displaying the signal recovered by the information recovery means, wherein the shape of the displayed video picture indicates the presence of eccentricity in the video disc or in the player apparatus.

2. A method as defined in claim 1, wherein:

the test pattern represented by the video signal recorded in the step of recording includes a substantially straight reference line that is displaced by a prescribed amount on each successive video frame; and eccentricity in either the video disc or the player apparatus causes the information recovery means to recover a segment of the straight reference line from each track, as the recovery means scans across each track, to develop a series of time displaced straight line segments, which causes the reference line of the displayed video picture to appear to be curved, the magnitude of the apparent curve indicating the magnitude of the eccentricity.

3. A method as defined in claim 2, wherein the test pattern represented by the video signal recorded in the step of recording further includes a fixed grid pattern recorded on each of said tracks, whereby the magnitude of any apparent curve in the displayed reference line can be determined by comparison to the displayed grid pattern.

4. A method as defined in claim 2, wherein:

the reference line in the test pattern is recorded so as to be vertically oriented and located on the left side of the video picture for the video signal recorded on the track at one edge of the set of tracks, located on the right side of the video picture for the video signal recorded on the track at the other edge of the set of tracks, and located at successive horizontal positions between said left and right sides of the video picture for the video signals recorded on the corresponding successive tracks between said one edge and said other edge of the set of tracks; and the reference line is displaced by a substantially constant amount on each successive video frame.

5. A method as defined in claim 1, wherein the step of scanning maintains the information recovery means at a fixed radius location relative to the center of the rotating video disc.

6. A method for detecting eccentricity in a video disc and in a player apparatus for playing the video disc, the player apparatus including means for rotating the disc at a prescribed constant rate and information recovery means for scanning the rotating disc to recover a video signal recorded on it, the method comprising steps of:

recording a prescribed video signal on a set of adjacent recording tracks on the video disc, each video frame of the signal being recorded on a separate one of the successive tracks, the video signal representing a test pattern that includes a vertically-oriented reference line that is located on the left side of the video picture for the video signal recorded on the track at one edge of the set of tracks, located on the right side of the video picture for the video signal recorded on the track at the other edge of the set of tracks, and located at successive horizontal positions between said left and right sides of the video picture for the video signals recorded on the corresponding successive tracks between said one edge and said other edge of the set of tracks, the reference line being displaced by a substantially constant amount on each successive video frame;

scanning the set of adjacent recording tracks using the information recovery means with the information recovery means maintained at a fixed radius relative to the rotating disc, any eccentricity in the video disc or in the player apparatus causing the information recovery means to scan cyclically across a plurality of tracks and successively recover segments of the video signal recorded on each track; and displaying the signal recovered by the information recovery means, wherein eccentricity in either the video disc or the player apparatus causes the reference line of the displayed video picture to appear to be curved, the magnitude of the apparent curve indicating the magnitude of the eccentricity; and wherein the test pattern represented by the video signal recorded in the step of recording further includes a fixed grid pattern, whereby the magnitude of any apparent curve in the displayed reference line can be determined by comparison to the displayed grid pattern.

7. A method for detecting eccentricity in a video disc and in a player apparatus for playing the video disc, wherein a prescribed video signal is recorded on a set of adjacent recording tracks on the video disc, each video frame of the signal being recorded on a separate one of the successive tracks, the video signal representing a test pattern giving the effect of a prescribed movement of at least a part of the test pattern on successive frames, and wherein the player apparatus includes means for rotating the disc at a prescribed constant rate and information recovery means for scanning the rotating disc with a radiant energy beam to recover a video signal recorded on it, and a tracking servo for controllably directing the beam to impinge continuously on a selected recording track on the disc, the tracking servo being operable in conventional closed loop and open loop conditions, the method comprising steps of:

scanning the set of adjacent recording tracks using the information recovery means while operating the tracking servo in the open loop condition, any eccentricity in the video disc or in the player apparatus causing the information recovery means to scan cyclically across a plurality of tracks and successively recover segments of the video signal recorded on each track; and displaying the signal recovered by the information recovery means, wherein the shape of the displayed video picture indicates the presence of eccentricity in the video disc or in the player apparatus.

8. A method as defined in claim 7, wherein:

the test pattern represented by the recorded video signal includes a fixed grid pattern and a substantially straight reference line, the reference line being displaced by a prescribed amount on each successive video frame;

eccentricity in either the video disc or the player apparatus causes the reference line of the displayed video picture to appear to be curved, the magnitude of the apparent curve indicating the magnitude of the eccentricity; and the method further includes a step of comparing the magnitude of any apparent curve in the displayed reference line to the displayed fixed grid pattern, to determine the magnitude of the eccentricity.

9. A method as defined in claim 7, wherein the step of scanning maintains the information recovery means at a fixed radius relative to the center of the rotating video disc.

10. A method for recording a prescribed eccentricity test pattern signal on a video disc, comprising steps of:

producing a video signal that represents an eccentricity test pattern having a substantially straight reference line that exhibits prescribed, uniform movement on successive frames of the video signal; and recording the video signal on a prescribed set of adjacent recording tracks on the video disc, each frame of the signal being recorded on a separate one of the successive tracks.

11. A method as defined in claim 10, wherein:

the test pattern represented by the video signal produced in the step of producing further includes a fixed grid pattern;

the reference line in the test pattern is vertically oriented and is located on the left side of the video frame recorded on the track at one edge of the set of tracks and on the right side of the video frame recorded on the track at the other edge of the set of tracks; and the reference line is displaced by a substantially constant amount on each successive video frame.

* * * * *